US012795405B2

(12) United States Patent
Pham et al.

(10) Patent No.: US 12,795,405 B2
(45) Date of Patent: Nov. 10, 2026

(54) RADIO ACCESS NETWORK CAPABILITY AWARE AUTOMATIC CONFIGURATION MANAGEMENT

(71) Applicant: Dell Products L.P., Round Rock, TX (US)

(72) Inventors: Thang Pham, Dollard-des-Ormeaux (CA); Ramy Atawia, Kanata (CA)

(73) Assignee: DELL PRODUCTS L.P., Round Rock, TX (US)

( * ) Notice: Subject to any disclaimer, the term of this patent is extended or adjusted under 35 U.S.C. 154(b) by 294 days.

(21) Appl. No.: 18/670,862

(22) Filed: May 22, 2024

(65) Prior Publication Data

US 2025/0365584 A1 Nov. 27, 2025

(51) Int. Cl.
*H04W 24/02* (2009.01)
*H04L 41/0816* (2022.01)
*H04L 47/125* (2022.01)

(52) U.S. Cl.
CPC ......... *H04W 24/02* (2013.01); *H04L 41/0816* (2013.01); *H04L 47/125* (2013.01)

(58) Field of Classification Search
CPC ... H04W 24/02; H04L 41/0816; H04L 47/125
USPC ........................................................ 370/230
See application file for complete search history.

(56) References Cited

U.S. PATENT DOCUMENTS

2022/0200857 A1* 6/2022 Feki ...................... H04L 41/142
2022/0376976 A1* 11/2022 Ramasamy ......... H04L 43/0876
2025/0193077 A1* 6/2025 Masood .................. G06F 3/121
2025/0247291 A1* 7/2025 Shete .................. H04L 41/0813

* cited by examiner

*Primary Examiner* — Asad M Nawaz
*Assistant Examiner* — Hugh Mark Ashley
(74) *Attorney, Agent, or Firm* — Amin, Turocy & Watson, LLP

(57) ABSTRACT

Radio access network capability aware automatic configuration management (e.g., using a computerized tool), is enabled. For example, a system can comprise at least one processor and at least one memory that stores executable instructions that, when executed by the processor, facilitate performance of operations. The operations can comprise requesting, from network equipment of a radio access network, configuration capability information representative of a configuration capability of the radio access network. The operations can further comprise, in response to requesting the configuration capability information, receiving the configuration capability information from the network equipment. The operations can further comprise, based on the configuration capability of the radio access network, determining a configuration change applicable to the radio access network. The operations can further comprise applying the configuration change to the radio access network.

20 Claims, 13 Drawing Sheets

| Config Type | Parameter Examples |
| --- | --- |
| Immediate Activation | userLabel, perfMetricJob |
| Cell Locked | absoluteFrequencySSB, sSBSubCarrierSpacing, cellLocalId |
| Node Locked | PlmnId, gNBId, gnbIdLength |

FIG. 6a

| Parameter Example | Config Type | | |
| --- | --- | --- | --- |
| | Low Load ( <L1) | Medium Load (<L2) | High Load (>L2) |
| a3Offset, reportOnLeave, hysteresis, timeToTrigger | Immediate Activation | Delay Activation | Possible capability<br>1) Event-based (mobility, incoming call)<br>2) Cell Soft-Locked |

FIG. 6b

| Parameters in SMO Reconfig Req | Southbound interface Message | Reconfig. Delay |
|---|---|---|
| Param_1 | SIB | d1 |
| Param_2 | UE Context | d1 |
| Param_3 | SIB | d1 |
| Param_1+Param_2 | SIB + UE Context | 2*d1 |
| Param_1+Param_3 | SIB2 | d1 |
| Param_1+Param_2+ Param_3 | SIB2 + UE Context | 2*d1 |

RADIO ACCESS NETWORK CAPABILITY AWARE AUTOMATIC CONFIGURATION MANAGEMENT

BACKGROUND

In radio access networks (RANs), different RAN vendors have different capabilities to reconfigure the network function (NF) parameters during run-time. For some parameters, when reconfigured, the new value takes effect immediately, while others require additional steps from operators (e.g., cell locked/unlocked) which, for instance, can be due to interactions with user equipment (UE) and extra signaling between different NFs. The foregoing can be a result of proprietary software designs and hardware limitations, which differ across vendors for each configurable parameter. Open RAN (O-RAN) does not provide a method for an operator to determine a required set of actions for completing the reconfiguration of a specific parameter.

The above-described background relating to RANs is merely intended to provide a contextual overview of some current issues and is not intended to be exhaustive. Other contextual information may become further apparent upon review of the following detailed description.

BRIEF DESCRIPTION OF DRAWINGS

FIGS. 6*a* and 6*b* are example charts of example radio access network reconfiguration requirements messages in accordance with one or more example embodiments described herein.

DETAILED DESCRIPTION

Figure 1:
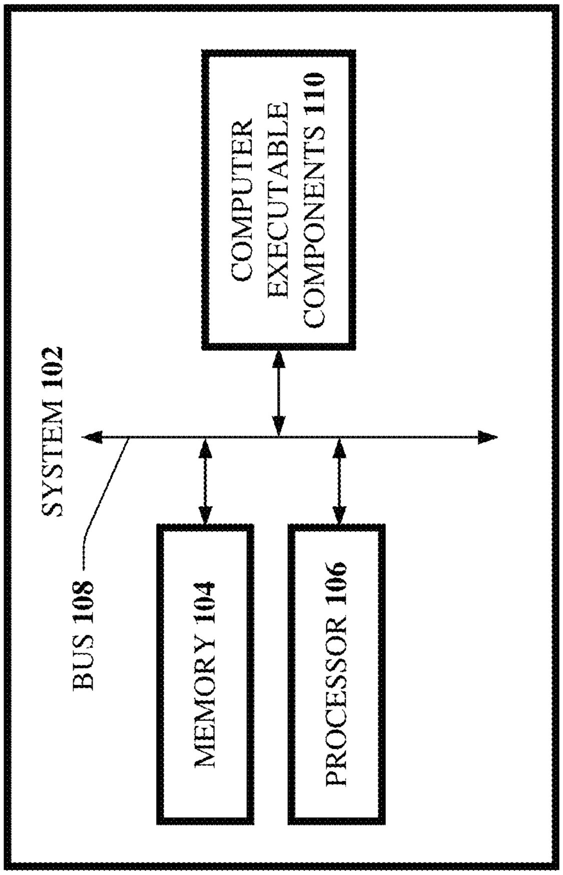
FIG. 1 is a block diagram of a non-limiting example system in accordance with one or more example embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, RAN configuration management can be improved in various ways, and various embodiments are described herein to this end and/or other ends. The disclosed subject matter relates to radio access network capability aware automatic configuration management.

According to an example embodiment, a system can comprise at least one processor, and at least one memory that stores executable instructions that, when executed by the processor, facilitate performance of operations, comprising requesting, from network equipment of a radio access network, configuration capability information representative of a configuration capability of the radio access network, in response to requesting the configuration capability information, receiving the configuration capability information from the network equipment, based on the configuration capability of the radio access network, determining a configuration change applicable to the radio access network, and applying the configuration change to the radio access network.

In one or more example embodiments, the configuration capability information can be based on mapping information representative of a mapping between northbound interface messages and southbound interface messages of the radio access network.

In one or more example embodiments, the configuration capability information can be determined during runtime of the network equipment. In various embodiments, any change to the configuration capability can be automatically reported by the radio access network.

In one or more example embodiments, the configuration capability information can comprise parameters that are concurrently configurable.

In one or more example embodiments, the configuration capability information can comprise a configuration delay applicable to the configuration change.

In one or more example embodiments, the configuration change can be determined based on a traffic load applicable to the radio access network.

In one or more example embodiments, the configuration change can be determined based on a predicted network impact on the radio access network.

In one or more example embodiments, the configuration capability can comprise at least one of an immediate activation, an event-based activation, a cell lock, a node lock, a delay execution with a maximum window limit, or a network function restart.

In one or more example embodiments, the configuration change can comprise a change to one or more parameters associated with the radio access network. In this regard, the one or more parameters can comprise at least one of a user label, a performance metric job, an absolute frequency of a synchronization signal block, a synchronization signal block subcarrier spacing, a cell local identifier, a public land mobile network identifier, a gNodeB identifier, a gNodeB identifier length, a third generation partnership project standard, an open radio access network standard, or a vendor specific standard.

In another example embodiment, a non-transitory machine-readable medium can comprise executable instructions that, when executed by a processor, facilitate performance of operations, comprising receiving, from a service and management and orchestration network device, a patch of parameters for reconfiguration, based on the patch of parameters, determining configuration capability information representative of a configuration capability of a radio access network, based on the configuration capability of the radio access network, determining a configuration change applicable to the radio access network, and applying the configuration change to the radio access network, or in response to a determination that the configuration change cannot currently be applied to the radio access network, sending, to the service and management and orchestration network device, feedback to reconfigure a parameter of the service and management and orchestration network device.

In one or more example embodiments, the configuration capability information can be based on mapping information representative of a mapping between northbound interface messages and southbound interface messages of the radio access network.

In one or more example embodiments, the configuration capability information can comprise parameters that are simultaneously configurable.

In one or more example embodiments, the configuration capability information can comprise a configuration delay applicable to the configuration change.

In one or more example embodiments, the configuration change can be determined based on a traffic load applicable to the radio access network.

In yet another example embodiment, a method can comprise requesting, from network equipment of a radio access network, by a service and management and orchestration network device, configuration capability information representative of a configuration capability of the radio access network, in response to requesting the configuration capability information, receiving, by the service and management and orchestration network device, the configuration capability information from the network equipment, based on the configuration capability of the radio access network, determining, by the service and management and orchestration network device, a configuration change applicable to the radio access network, and applying, by the service and management and orchestration network device, the configuration change to the radio access network.

In one or more example embodiments, the configuration change can be determined based on a predicted network impact on the radio access network.

In one or more example embodiments, the configuration capability can comprise at least one of an immediate activation, an event-based activation, a requested cell lock, a requested node lock, a delay execution with a maximum window limit, or a requested network function restart.

In one or more example embodiments, the configuration change can comprise a change to one or more parameters associated with the radio access network.

In one or more example embodiments, the configuration capability information can be based on mapping information representative of a mapping between northbound interface messages and southbound interface messages of the radio access network.

Embodiments herein enable automation of RAN configuration deployment. Currently, a service management & orchestrator (SMO) and RAN vendor pre-agree on configuration parameter policies, such as the series of actions to complete reconfiguration, which can be tedious for large scale deployment and also hinders automation. Embodiments herein enable an SMO to identify the reconfiguration requirements of each parameter, for instance, based on reported RAN NF capabilities over O-RAN management interfaces. The requirements can be dependent on the NF processing power, time-varying network load, software design, and/or overhead to southbound interfaces that propagate the reconfiguration across the network.

Currently, the RAN vendor, SMO, and operator must agree offline (e.g., pre-agree) on how to handle each configuration parameter (e.g., require cell locked/unlocked, network function restart, or effective immediately). The SMO then implements the configuration strategy based on pre-agreed configuration parameter policy. This manual approach is prone to errors and increases the time to market. Whenever there is a new change, re-adaptation and software re-alignment between SMO and RAN vendor would need to take place again. The problem is compounded with multi-vendor RANs.

Embodiments herein enable autonomous RAN reconfiguration based on identification of the vendor reconfiguration capability and additional requirement(s) for each parameter, for instance, during runtime through the below capabilities of various embodiments described herein:

1. Reconfiguration capability broadcasting: The RAN NF (e.g., centralized unit (CU), radio unit (RU), or distributed unit (DU)) can report its respective capability and requirement for reconfiguration of each parameter to the SMO over the management interface (e.g., O1 and/or R1). The reported requirements can include, for instance, a set of actions that the SMO (e.g., and the operator) must perform to complete the reconfiguration across the NFs. The resultant actions of capability-aware reconfiguration can be either implemented by the SMO or driven by the RAN network function, in which the latter groups the parameters of similar requirements in the same message are to minimize overhead.
2. Southbound interface parameter awareness: While calculating its capabilities, the NF of a RAN herein can consider the mapping between the requested reconfigurations from the northbound interface (e.g., O1 and/or R1) and the southbound interface messages (e.g., 3GPP F1 and/or RRC) that can propagate new values towards the other network functions and UEs. The NF (e.g., RAN) can also consider whether the parameter is cell-level and could thus be broadcasted simultaneously or is UE-level which requires dedicated RRC signaling per UE. In this regard, the NF (e.g., RAN) can avoid double counting the requirements for the parameters bundled in the same southbound interface message.
3. Realtime reconfiguration capability change: The capability can be updated during runtime by the NF (e.g., RAN) and indicate for instance (a) the set of parameters that could be simultaneously configured without additional actions from an operator and (b) the associated reconfiguration delay for each parameter. This update can be based on the traffic load (e.g., number of connected users), and the impact on the network if the reconfiguration is applied (e.g., extra signaling across the NFs and UEs). This can prevent an operator from performing concurrent reconfigurations of multiple parameters that trigger signaling storms and cause sudden degradation in user throughput.

4. The aforementioned signaling exchange can occur over 3GPP (e.g., as F1, E1, and/or Uu (RRC messages)), and/or O-RAN defined interfaces (e.g., O1, R1, A1, and/or E2).

Figure 3:
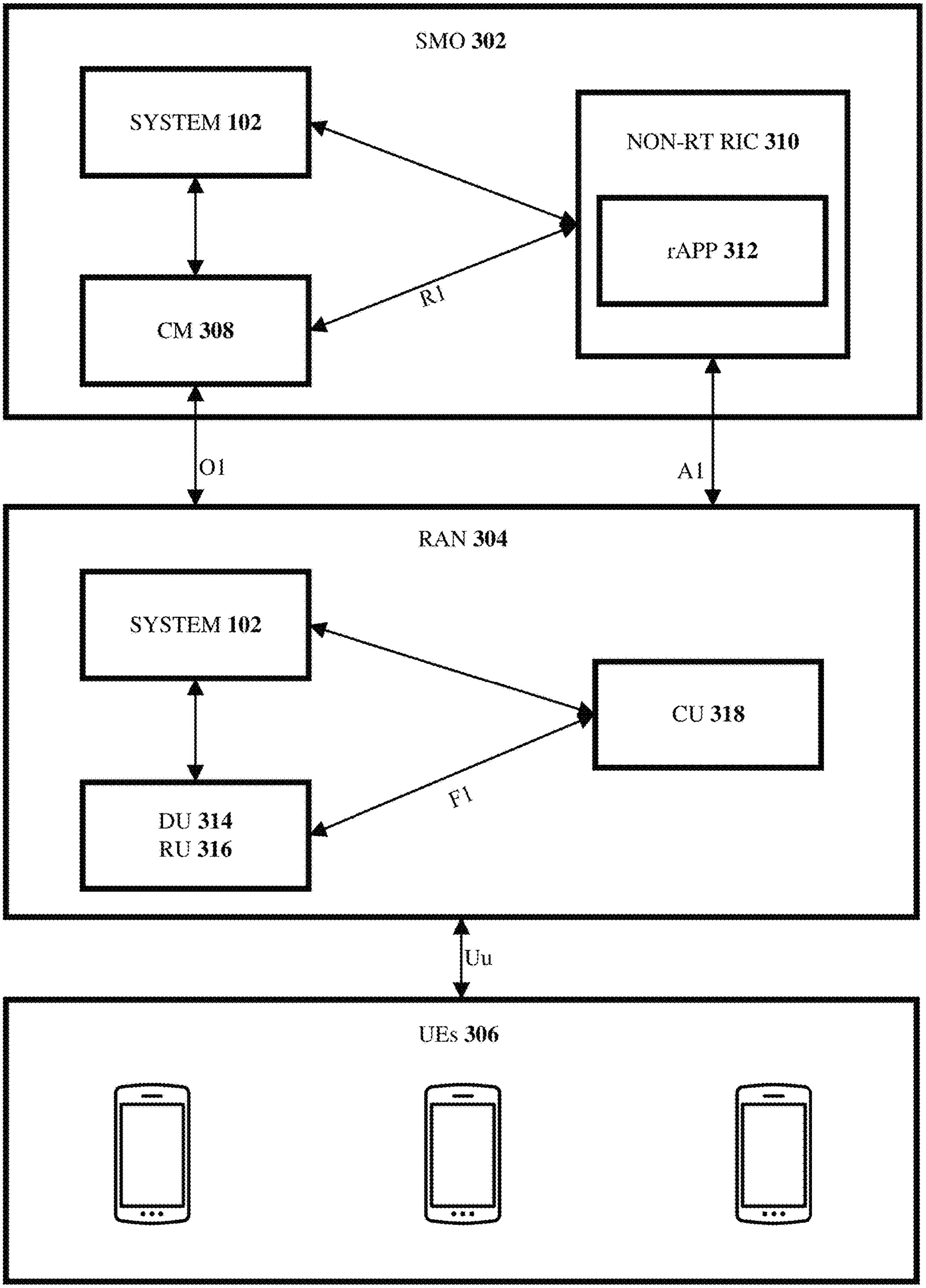
FIG. 3 is a block diagram of non-limiting system architecture in accordance with one or more example embodiments described herein.

Turning now to FIG. 1, there is illustrated an example, non-limiting system 102 in accordance with one or more example embodiments herein. System 102 can comprise a computerized tool, which can be configured to perform various operations relating to radio access network capability aware automatic configuration management. The system 102 can comprise one or more of a variety of components, such as memory 104, processor 106, bus 108, and/or computer executable components 110. In various embodiments, one or more of the memory 104, processor 106, bus 108, and/or computer executable components 110 can be communicatively or operably coupled (e.g., over a bus or wireless network) to one another to perform one or more functions of the system 102. It is noted that (as depicted in FIG. 3) an SMO (e.g., SMO 302) and/or a RAN (e.g., RAN 304) can comprise the system 102.

Figure 2:
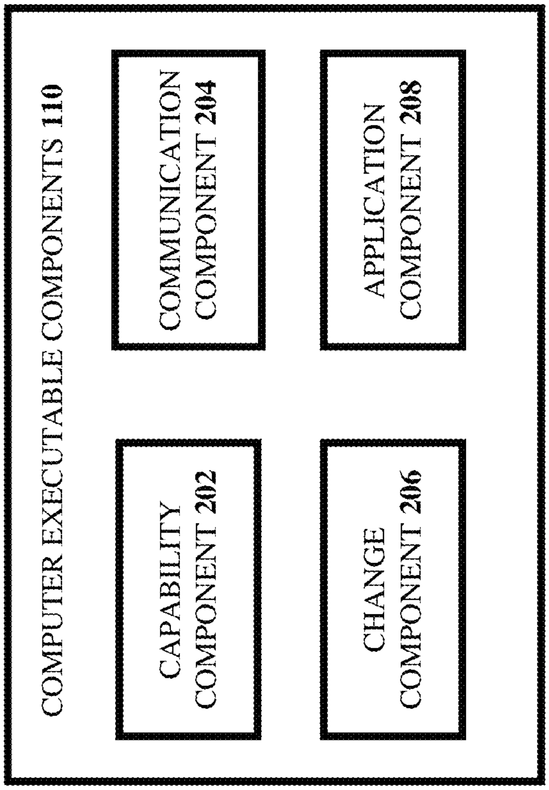
FIG. 2 is a block diagram of a non-limiting example computer executable components in accordance with one or more example embodiments described herein.

FIG. 2 illustrates a block diagram of example, non-limiting computer executable components 110 that can facilitate radio access network capability aware automatic configuration management in accordance with one or more embodiments described herein. Repetitive description of like elements employed in other embodiments described herein is omitted for sake of brevity. As shown in FIG. 2, the one or more computer executable components 110 can comprise capability component 202, communication component 204, change component 206, and/or application component 208.

As discussed above, an SMO (e.g., SMO 302) and/or a RAN (e.g., RAN 304) can comprise the system 102. According to an embodiment, when the system 102 is part of the SMO 302, the capability component 202 can request from network equipment of a radio access network (e.g., RAN 304), configuration capability information representative of a configuration capability of the radio access network (e.g., RAN 304). In various embodiments, such configuration capability can comprise configuration of parameters such as a power control parameter, change in cell ID, change in public land mobile network (PLMN) ID, or other suitable parameters applicable to a RAN 304 herein. In various embodiments, the configuration capability can comprise at least one of an immediate activation, an event-based activation, a cell lock, a node lock, a delay execution with a maximum window limit, or a network function restart. An immediate activation can comprise a capability to enact configuration changes or activate network features instantaneously upon receiving the instruction or trigger. In this regard, as soon as the instruction is issued, the RAN 304 can implement the requested changes without any delay. An event-based activation can comprise triggering reconfiguration or activation of network features based on specific events or conditions. For example, a network element can be configured to activate additional capacity or optimize its parameters in response to high traffic volumes, changes in network topology, or the detection of certain fault conditions. In another example, a new parameter value is only applied to new incoming call (e.g., existing call would keep all parameter), or new UE 306 entering the cell. A cell lock can comprise a mechanism to prevent configuration changes or modifications to specific cells within the RAN 304. This capability ensures that certain cells remain locked from any reconfiguration attempts, which can be useful in maintaining stable service in critical areas or during specific network operations. A node lock can prevent configuration changes or modifications to specific network nodes or elements. This capability enables an SMO 302 or a network operator to safeguard the configuration of important network elements, such as core network nodes or critical infrastructure, from unintended modifications. A delay execution with a maximum window limit can enable an SMO 302 or an operator to schedule reconfiguration tasks or activations to occur after a specified delay, while also setting a maximum time window within which the task must be completed. This capability provides flexibility in planning network changes while ensuring that the execution occurs within a defined timeframe. A network function restart can comprise restarting specific network functions or services to apply configuration changes or reset the state of the network element. This capability is often used to implement major configuration updates or to recover from faults or performance issues by restarting affected functions without interrupting overall network operation.

In various embodiments, the configuration capability information can be based on mapping information representative of a mapping between northbound interface messages and southbound interface messages of the radio access network. Such mapping can be for configuration messages, which over a northbound interface can comprise configuration messages from network management systems or higher-level network elements could include instructions for configuring parameters of the RAN, such as coverage areas, power levels, handover thresholds, etc., and over a southbound interface can be mapped to specific configuration messages that are sent down to the individual base stations to implement the changes in the RAN 304. Further, such mapping can be for traffic management messages, which over a northbound interface can comprise requests for allocating more bandwidth to specific cells or adjusting quality of service parameters and can originate from network controllers or traffic management systems, and over a southbound interface can be translated into suitable instructions and sent down to the base stations to implement the changes in the allocation and management of radio resources. Additionally, such mapping can be for fault management messages, which over a northbound interface can comprise alarms and/or notifications about network faults or performance degradation and can be sent from the RAN 304 elements to higher-level network management systems for monitoring and analysis. Further, such mapping can be for handover and mobility management messages, which over a northbound interface can comprise requests for handovers or mobility management instructions that can originate from core network elements or neighboring cells in the case of inter-cell handovers, and over a southbound interface can be mapped to appropriate signaling messages that can be sent to the relevant base stations to coordinate the handover process and ensure seamless mobility for UEs herein. In various embodiments, the configuration capability information can be determined (e.g., via the capability component 202) during runtime of the network equipment (e.g., of the RAN 304). In this regard, any change to the configuration capability can be automatically reported by the RAN 304.

In various embodiments, the configuration capability information can comprise parameters that are concurrently configurable. In various embodiments, the configuration capability information can comprise a configuration delay applicable to the configuration change. In one or more embodiments, the configuration capability information can comprise a maximum delay applicable to the RAN 304. In one or more embodiments, the configuration delay can be determined (e.g., via the capability component 202) via a measured delay applicable to the configuration change or via a predicted delay applicable to the configuration change.

According to an embodiment, the communication component 204 (e.g., of the SMO 302) can, in response to requesting the configuration capability information, receive the configuration capability information from the network equipment (e.g., of the RAN 304). According to an embodiment, the change component 206 can, based on the configuration capability of the radio access network (e.g., RAN 304), determine a configuration change applicable to the radio access network (e.g., RAN 304). In various embodiments, the configuration change can be determined based on a traffic load applicable to the radio access network. In further embodiments, the configuration change can be determined based on a predicted (e.g., via the change component 206) network impact on the RAN 304. For instance, such a configuration can change can be predicted to impact one or more of coverage and/or capacity of the RAN 304, handover performance associated with the RAN 304, interference management associated with the RAN 304, mobility management associated with the RAN 304, resource allocation associated with the RAN 304, energy efficiency associated with the RAN 304, service quality associated with the RAN 304, or other suitable impacts on the RAN 304.

According to an embodiment, the application component 208 can apply the configuration change to the radio access network (e.g., RAN 304). In various embodiments, the configuration change can comprise a change to one or more parameters associated with the RAN 304. In this regard, the one or more parameters can comprise at least one of a user label, a performance metric job, an absolute frequency of a synchronization signal block, a synchronization signal block subcarrier spacing, a cell local identifier, a public land mobile network identifier, a gNodeB identifier, a gNodeB identifier length, or another suitable parameter. Further, it is noted that, the one or more parameters can additionally, or alternatively comprise a third generation partnership project standard, an open radio access network standard, or a vendor specific standard.

As discussed above, an SMO (e.g., SMO 302) and/or a RAN (e.g., RAN 304) can comprise the system 102. According to an embodiment, when the system 102 is part of the RAN 304, the communication component 204 can receive, from a service and management and orchestration network device (e.g., SMO 302), a patch of parameters for reconfiguration. In various embodiments, such parameters can comprise as a power control parameter, change in cell ID, change in PLMN ID, or other suitable parameters applicable to a RAN 304 herein. The capability component 202 can then, based on the patch of parameters, determine configuration capability information representative of a configuration capability of a radio access network (e.g., RAN 304). In various embodiments, the configuration capability can comprise at least one of an immediate activation, an event-based activation, a cell lock, a node lock, a delay execution with a maximum window limit, or a network function restart. The change component 206 can then, based on the configuration capability of the radio access network (e.g., RAN 304), determine a configuration change applicable to the radio access network (e.g., RAN 304). In various embodiments, the configuration change can be determined (e.g., via the change component 206) based on a traffic load applicable to the radio access network. In this regard, the configuration change can be determined (e.g., via the change component 206) based on delay configuration capability determination based on measured or predicted traffic load. In further embodiments, the configuration change can be determined (e.g., via the change component 206) based on a predicted (e.g., via the change component 206) network impact on the RAN 304. For instance, such a configuration can change can be predicted (e.g., via the change component 206) to impact one or more of coverage and/or capacity of the RAN 304, handover performance associated with the RAN 304, interference management associated with the RAN 304, mobility management associated with the RAN 304, resource allocation associated with the RAN 304, energy efficiency associated with the RAN 304, service quality associated with the RAN 304, or other suitable impacts on the RAN 304. The application component 208 can then apply the configuration change to the radio access network (e.g., RAN 304). Alternatively, the communication component 204 can, in response to a determination (e.g., via the capability component 202) that the configuration change cannot currently be applied to the RAN 304, send (e.g., to the SMO 302), feedback to reconfigure a parameter of the SMO 302.

FIG. 3 is a block diagram of non-limiting system architecture in accordance with one or more example embodiments described herein. As discussed above, an SMO (e.g., SMO 302) and/or a RAN (e.g., RAN 304) can comprise the system 102. In various embodiments, the SMO 302 can comprise the system 102, configuration manager 308, non-real-time RAN intelligent controller (non-RT RIC 310), which can comprise one or more rAPPs 312. In various embodiments, the RAN 304 can comprise the system 102, DU 314, RU 316, and/or CU 318). It is noted that the RAN 304 can be communicatively coupled to one or more of the SMO 302 and/or one or more user equipment (e.g., UEs) 306. In various embodiments, the SMO 302 and/or non-RT RIC 310 can comprise configuring entities that facilitate capability checks and/or reconfiguration checks as a response, for instance, from a manual operator request or via autonomous action via one or more rApps 312. The RAN NF, such as DU 314, CU 318, and/or RU 316, can facilitate reconfiguration, reconfiguration capability update, southbound interface messages awareness (e.g., cell-level broadcast, UE specific radio resource control (RRC) messages, RRC, F1, etc.). The O-RAN interfaces O1 and R1 can be utilized (e.g., by the system 102) for propagating the configuration from the SMO 302 and/or non-RT RIC 310 towards the RAN 304. 3GPP interfaces such as F1 and Uu can be utilized to propagate the information further to other network functions and UEs 306.

Figure 4:
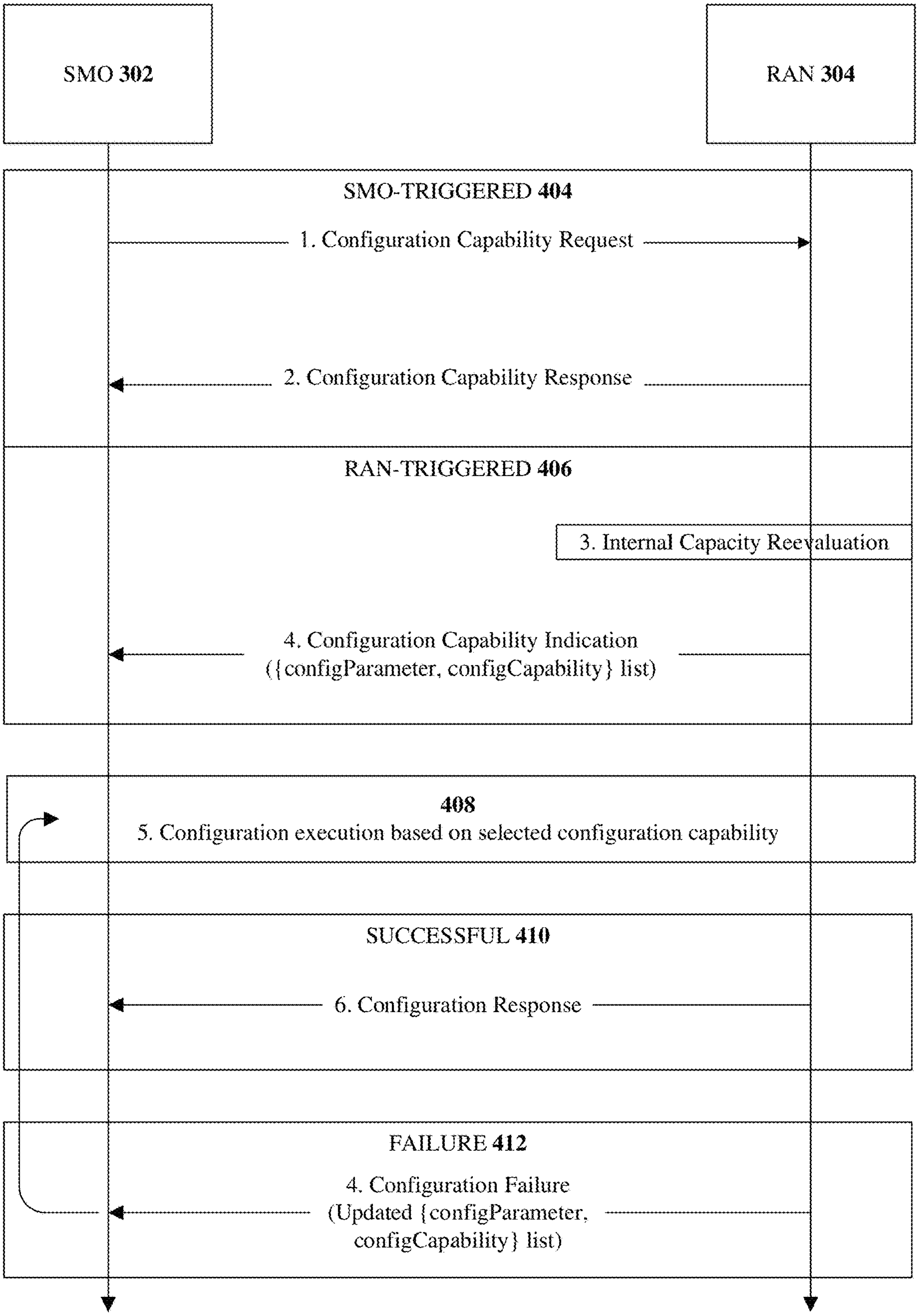
FIG. 4 is a flow diagram for a process associated with radio access network capability aware automatic configuration management in accordance with one or more example embodiments described herein.

FIG. 4 is a flow diagram for a process associated with radio access network capability aware automatic configuration management in accordance with one or more example embodiments described herein.

In various embodiments, for SMO 302 triggered reconfiguration 404, the SMO 302 can request configuration capabilities of the RAN 304 for all or a subset of the NF parameters. The RAN 304 can then respond with its respective configuration capability or capabilities. In various embodiments, each configuration parameter can be associated with a configuration capability such as immediate activation, event-based activation, cell lock required, node lock required, delay execution with a maximum window limit, and/or network function restart required.

In various embodiments, for RAN 304 triggered reconfiguration 406 (e.g., depending on internal factors such as capacity and/or traffic load), the RAN 304 can inform the SMO 302 that its configuration capability has changed, and/or send a reconfiguration capability update message.

At 408, depending on the use case (e.g., observed alarms and KPIs), the SMO 302 can configure a subset of RAN 304 parameters using the reported capability or capabilities. The RAN 304 can, for instance, either respond with configuration successful 410 or, depending on updated resource evaluation at the time, reject with a reason that includes updated configuration capability at 412. The RAN 304 can then retry the reconfiguration, send confirmation/rejection, and/or update the capability.

Figure 5A:
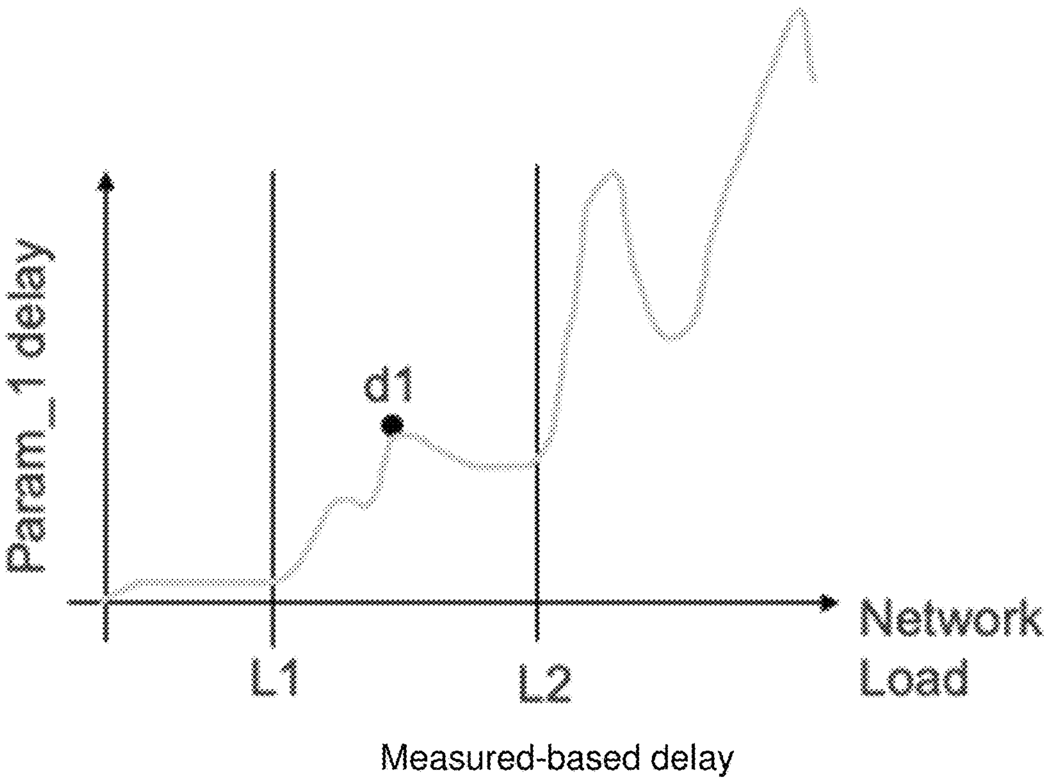
FIGS. 5*a* and 5*b* are example charts of example radio access network reconfiguration requirements (delay) in accordance with one or more example embodiments described herein.
Figure 5B:
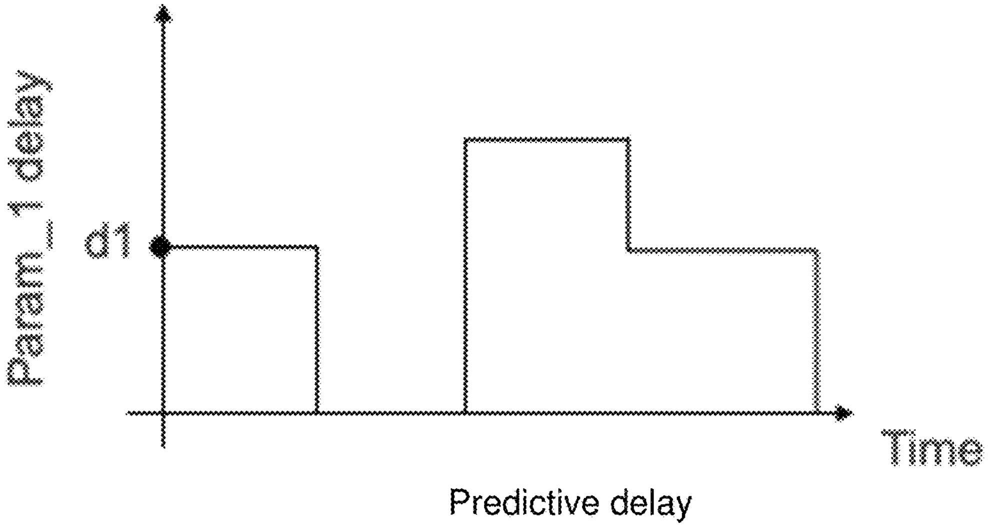

FIGS. 5*a* and 5*b* are example charts of example radio access network reconfiguration requirements (delay) in accordance with one or more example embodiments described herein. In various embodiments, the system 102 can determine (e.g., via the change component 206) the delay for applying a configuration herein based on (1) measurements of the duration needed to broadcast the new configuration to UEs 306 and for the UEs 306 to receive confirmation messages (e.g., FIG. 5*a*), and/or (2) prediction of a future time instant in which the network load is low and thus the signaling overhead associated with the parameter change is low (e.g., applicable for time-varying load) (e.g., FIG. 5*b*). For example, the prediction can be as simple as measurement past a busy hour. Some parameters can be UE-specific, and thus require request and confirm RRC messages to each UE 306, while other parameters can be cell-specific. For instance, such parameters can comprise handover, cell reselection, power control, admission control, or other suitable parameters.

FIG. 5*a* shows NF (e.g., of the RAN 304) measuring the network load and the corresponding reconfiguration requirement (e.g., measured in delay) for a single parameter. At low network load (<L1), the reconfiguration delay is almost negligible, and therefore the reconfiguration requirements by the NF could indicate immediate activation. At medium network load (<L2), the reconfiguration requirement could indicate a delay execution with a maximum window limit of d1. At high load (>L2), when the delay comprises high variation, reconfiguration needs to be performed (e.g., via the SMO 302) (e.g., via cell locked required). The SMO 302, or an operator, could reschedule reconfiguration for a future instance when the load is low (e.g., low delay). The delay/network load characterization can be achieved, for instance, either via actual measurement, analysis, or combination thereof. It is noted that O-RAN includes two architecture options: bundling of all managed functions as a gNodeB, or disaggregation of managed functions. In the first case, the delay can be computed (e.g., via the system 102), whereas in the second case, existing 3GPP E1/F1 resource status reporting can be utilized for managed functions to exchange load information or be augmented as required. FIG. 5*b* shows time-varying capability as a result of time-varying network/NF load.

FIGS. 6*a* and 6*b* are example charts of example RAN reconfiguration requirements messages in accordance with one or more example embodiments described herein. In this regard, FIGS. 6*a* and 6*b* show some example parameters in actual RAN deployment. In FIG. 6*a*, the reconfiguration capability for some RAN parameters does not change, regardless of load. In FIG. 6*b*, the reconfiguration capability is based on load. The reconfiguration would require RRC message update to each UE 306. Under high-load, the RAN 304 has, for instance, the option to utilize an event-based policy or cell soft-locked. With event-based policy, the reconfiguration would apply only to incoming user (e.g., a UE 306) of the cell, either through mobility or initial connection. Existing users (e.g., UEs 306) are not impacted. With cell soft-locked, the cell is locked for new incoming call or mobility—the SMO 302 can reschedule reconfiguration for a future instance when the load is low. All existing users would be impacted. It is noted that there can be three variations of cell locked: (1) hard—all users will be terminated immediately with re-direction to neighbor cells; (2) graceful—users are terminated over a period of time with re-direction; and (3) soft—incoming users are forbidden, existing users can be kept.

Figures 7A, 7B:
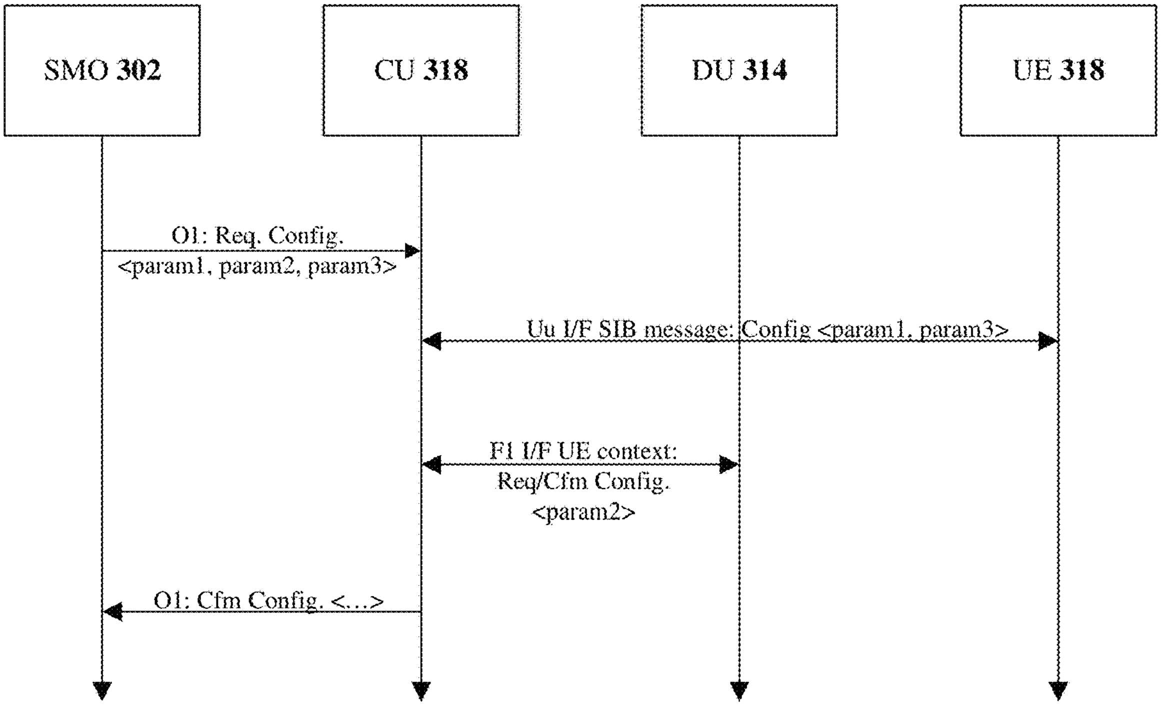
FIGS. 7*a* and 7*b* are an example table and an example flow diagram, respectively, for radio access network reconfiguration requirements in accordance with one or more example embodiments described herein.

FIGS. 7*a* and 7*b* are an example table and an example flow diagram, respectively, for radio access network reconfiguration requirements in accordance with one or more example embodiments described herein. In this regard, FIGS. 7*a* and 7*b* are an example of RAN reconfiguration requirements.

FIG. 7*a* shows an example of param_1+param_2 which have a total delay requirement higher than the single parameter delay requirement, for instance, since they require two different southbound interface messages, while Param_1+Param_3 have the same delay as Param_1 only, for instance, since they are part of the same southbound interface message to the UE or other NF. FIG. 7*b* is an example of NF southbound interface is the Uu (3GPP air interface) and an example of message is system information block (SIB) which is periodically transmitted to all UEs in the cell. Similarly, F1 interface is another southbound interface connecting CU with DU. The value of reconfiguration delay d1 is the time needed between the request and confirm messages between the interface endpoints (CU and DU for F1 interface, and gNodeB to UE for Uu).

Figure 8:
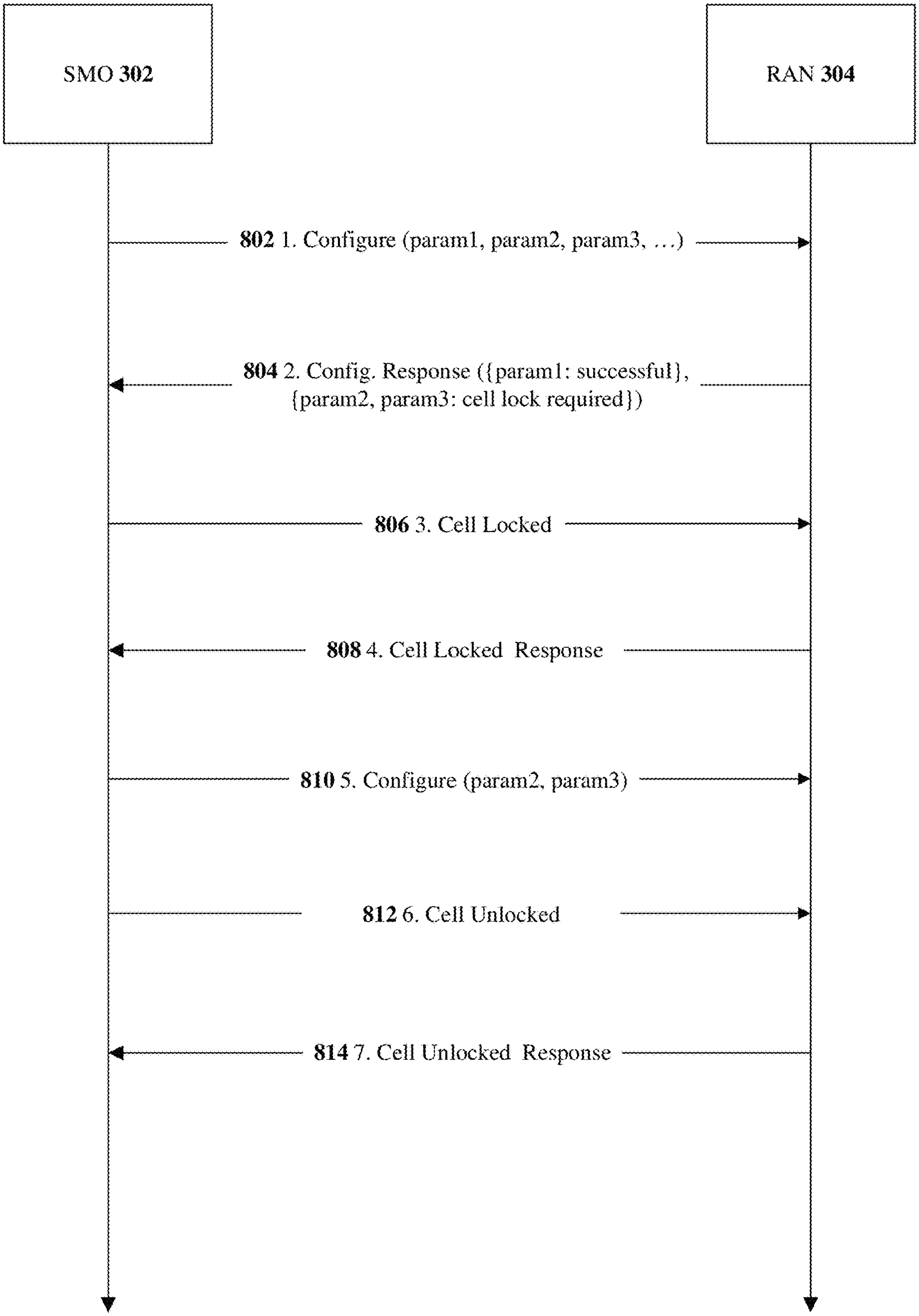
FIG. 8 is a flow diagram for a process associated with radio access network capability aware automatic configuration management in accordance with one or more example embodiments described herein.

FIG. 8 is a flow diagram for a process associated with radio access network capability aware automatic configuration management in accordance with one or more example embodiments described herein. In this regard, FIG. 8 illustrates RAN 304 guided reconfiguration. FIG. 8 demonstrates RAN NF ability to guide reconfiguration for each parameter based on its current requirements and capabilities. Here the SMO 302 does not need to host additional logic for the parameters reconfiguration that track the capability of the NF (i.e., provides a stateless reconfiguration). At 802, the SMO 302 sends a patch of parameters to the RAN 304 NF for reconfiguration. At 804, the NF of the RAN 304, based on capability and the size of the reconfiguration, responds with a series of subsequent actions for the SMO 302 to follow for completing the reconfiguration (e.g., cell lock request, NF restart request). For instance, the SMO 302 can provide a cell locked message at 806, and the RAN 304 can respond at 808 with a cell locked response. At 810, the SMO 302 can send a patch of parameters to RAN 304 NF for reconfiguration. The SMO 302 can provide a cell unlocked message at 812, and the RAN 304 can respond at 814 with a cell unlocked response. The SMO 302 can follow these requests to complete the reconfiguration. The NF of the RAN 304 can recommend a split on the number of parameters (e.g., new patch size) to the SMO 302. Also, the NF of the RAN 304 can classify the parameters based on the requirements for each set of parameters, in which parameters with the same set of follow-up actions are grouped together and their requirement will be in separate message to SMO 302.

Figure 9:
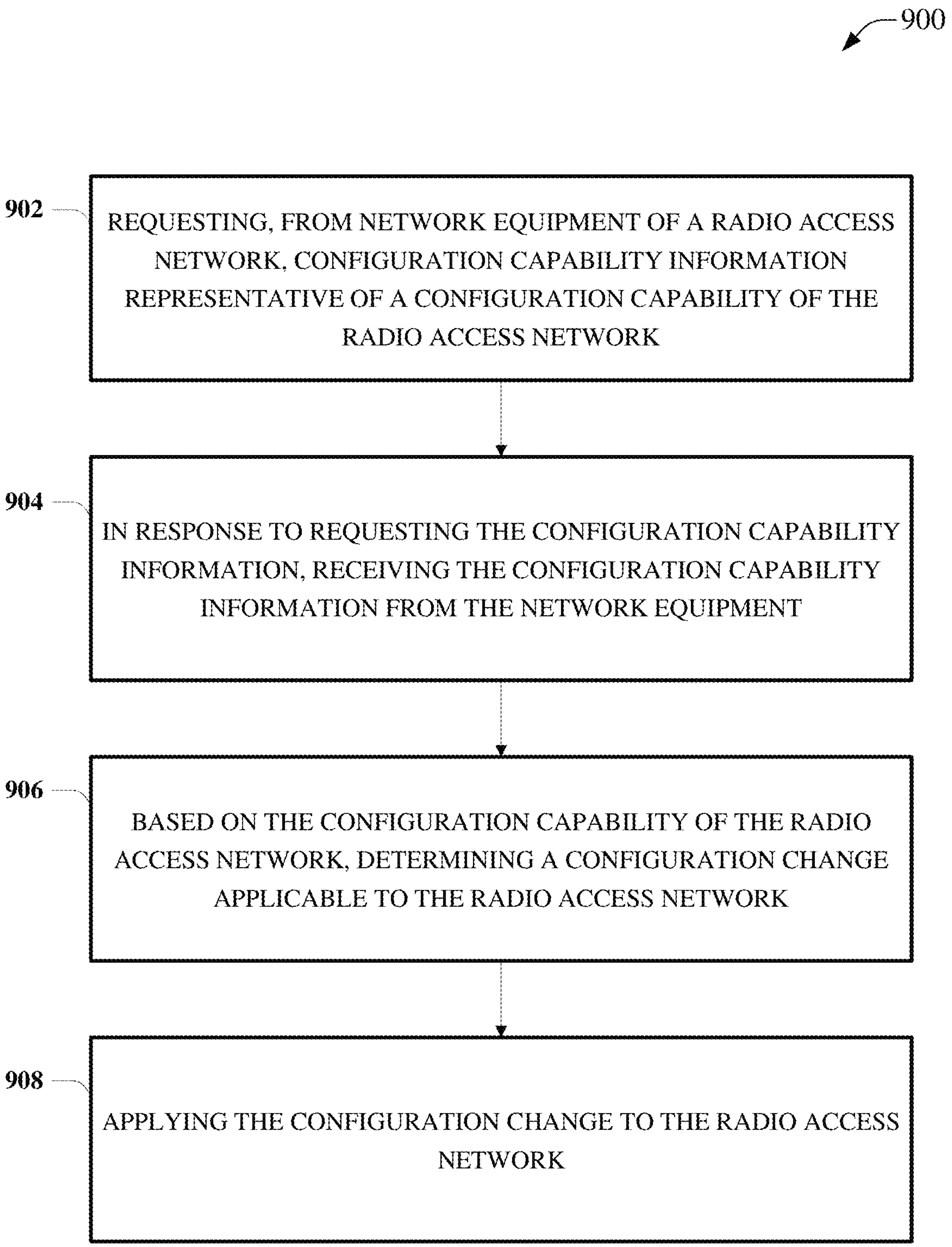
FIG. 9 is a block flow diagram for a process associated with radio access network capability aware automatic configuration management in accordance with one or more example embodiments described herein.

FIG. 9 illustrates a block flow diagram for a process 900 associated with radio access network capability aware automatic configuration management in accordance with one or more embodiments described herein. At 902, the process 900 can comprise requesting (e.g., via the capability component 202), from network equipment of a radio access network (e.g., RAN 304), configuration capability information representative of a configuration capability of the radio access network (e.g., RAN 304). At 904, the process 900 can comprise, in response to requesting the configuration capability information, receiving (e.g., via the communication component 204) the configuration capability information from the network equipment. At 906, the process 900 can comprise, based on the configuration capability of the radio access network (e.g., RAN 304), determining (e.g., via the change component 206) a configuration change applicable to the radio access network (e.g., RAN 304). At 908, the process 900 can comprise applying (e.g., via the application component 208) the configuration change to the radio access network (e.g., RAN 304).

Figure 10:
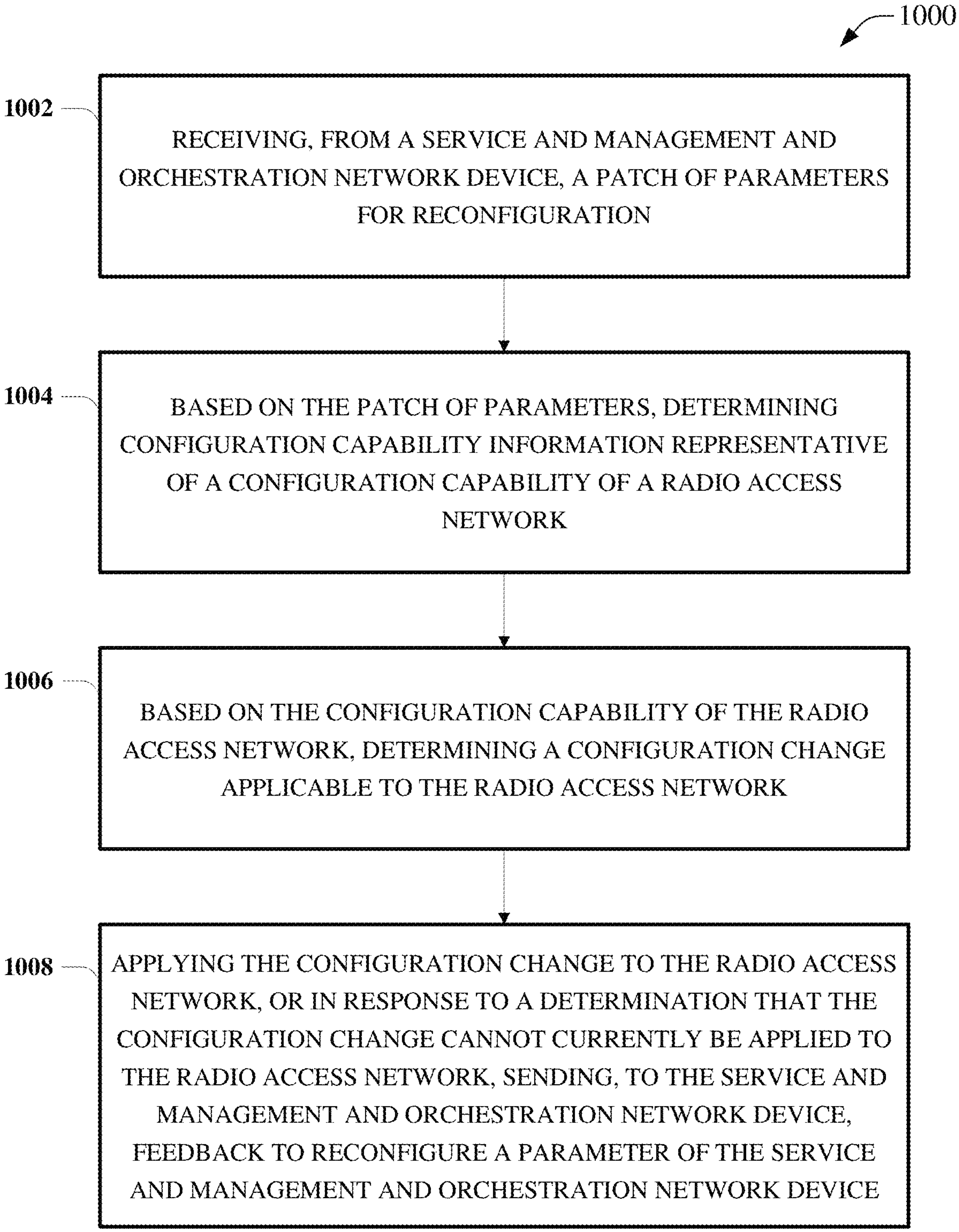
FIG. 10 is a block flow diagram for a process associated with radio access network capability aware automatic configuration management in accordance with one or more example embodiments described herein.

FIG. 10 illustrates a block flow diagram for a process 1000 associated with radio access network capability aware automatic configuration management in accordance with one or more embodiments described herein. At 1002, the process 1000 can comprise receiving (e.g., via the communication component 204), from a service and management and orchestration network device (e.g., SMO 302), a patch of parameters for reconfiguration. At 1004, the process 1000 can comprise, based on the patch of parameters, determining (e.g., via the capability component 202) configuration capability information representative of a configuration capability of a radio access network (e.g., RAN 304). At 1006, the process 1000 can comprise, based on the configuration capability of the radio access network (e.g., RAN 304), determining (e.g., via the change component 206) a configuration change applicable to the radio access network (e.g., RAN 304). At 1008, the process 1000 can comprise, applying (e.g., via the application component 208) the configuration change to the radio access network (e.g., RAN 304), or in response to a determination (e.g., via the capability component 202) that the configuration change cannot currently be applied to the radio access network (e.g., RAN 304), sending (e.g., via the communication component 204), to the service and management and orchestration network device (e.g., SMO 302), feedback to reconfigure a parameter of the service and management and orchestration network device (e.g., SMO 302).

Figure 11:
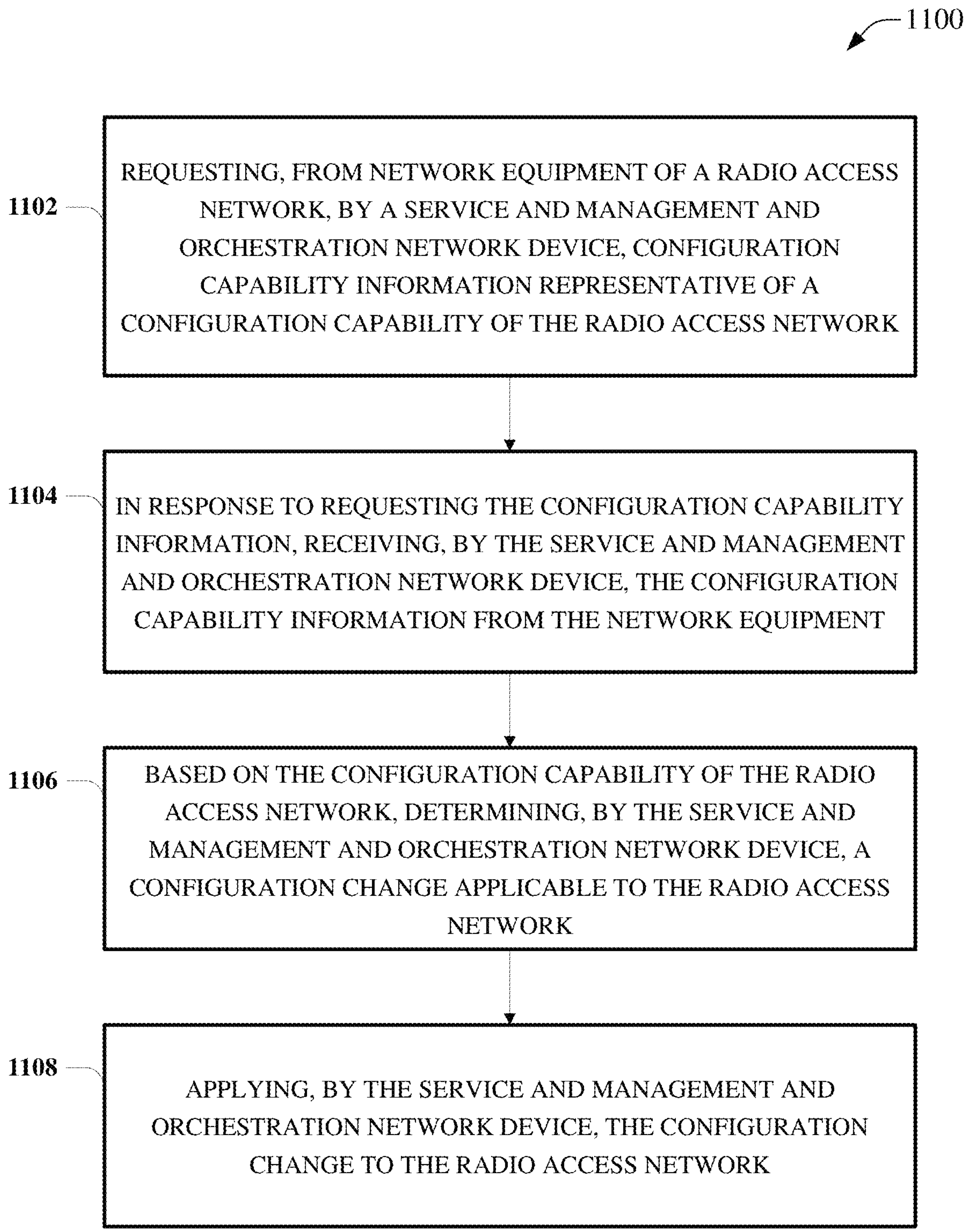
FIG. 11 is a block flow diagram for a process associated with radio access network capability aware automatic configuration management in accordance with one or more example embodiments described herein.

FIG. 11 illustrates a block flow diagram for a process 1100 associated with radio access network capability aware automatic configuration management in accordance with one or more embodiments described herein. At 1102, the process 1100 can comprise requesting (e.g., via the capability component 202), from network equipment of a radio access network (e.g., RAN 304), by a service and management and orchestration network device (e.g., SMO 302), configuration capability information representative of a configuration capability of the radio access network (e.g., RAN 304). At 1104, the process 1100 can comprise, in response to requesting the configuration capability information, receiving (e.g., via the communication component 204), by the service and management and orchestration network device (e.g., SMO 302), the configuration capability information from the network equipment. At 1106, the process 1100 can comprise, based on the configuration capability of the radio access network, determining (e.g., via the change component 206), by the service and management and orchestration network device (e.g., SMO 302), a configuration change applicable to the radio access network (e.g., RAN 304). At 1108, the process 1100 can comprise applying (e.g., via the application component 208), by the service and management and orchestration network device (e.g., SMO 302), the configuration change to the radio access network (e.g., RAN 304).

Figure 12:
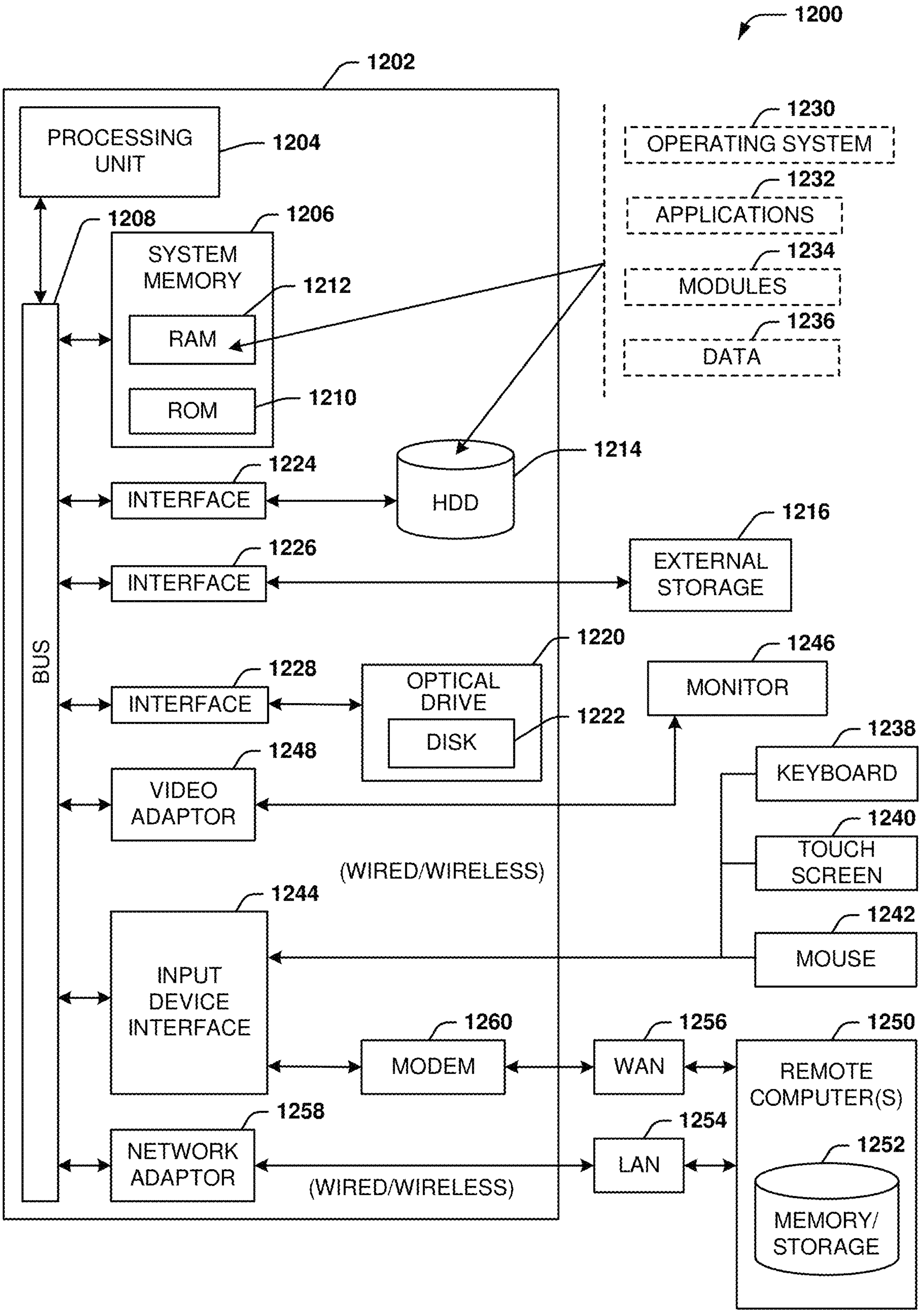
FIG. 12 is an example, non-limiting computing environment in which one or more embodiments described herein can be implemented.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a disk 1222, such as a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, brain computer interface, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can also be connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
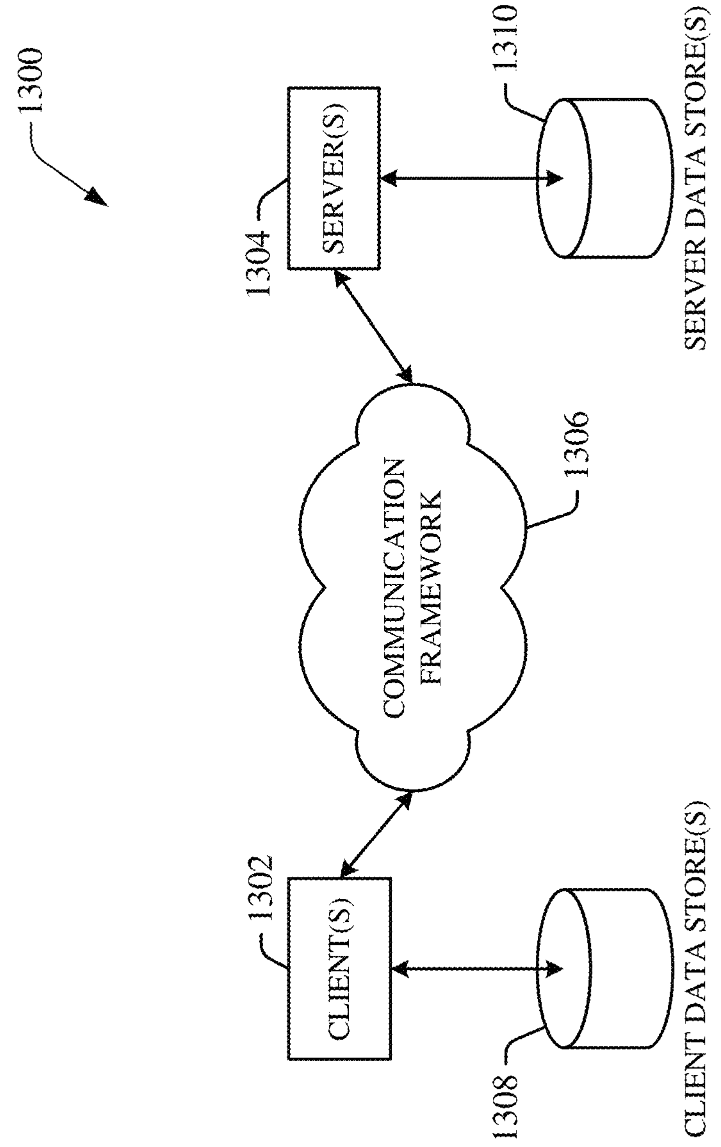
FIG. 13 is an example, non-limiting networking environment in which one or more embodiments described herein can be implemented.

Referring now to FIG. 13, there is illustrated a schematic block diagram of a computing environment 1300 in accordance with this specification. The system 1300 includes one or more client(s) 1302, (e.g., computers, smart phones, tablets, cameras, PDA's). The client(s) 1302 can be hardware and/or software (e.g., threads, processes, computing devices). The client(s) 1302 can house cookie(s) and/or associated contextual information by employing the specification, for example.

The system 1300 also includes one or more server(s) 1304. The server(s) 1304 can also be hardware or hardware in combination with software (e.g., threads, processes, computing devices). The servers 1304 can house threads to perform transformations of media items by employing aspects of this disclosure, for example. One possible communication between a client 1302 and a server 1304 can be in the form of a data packet adapted to be transmitted between two or more computer processes wherein data packets may include coded analyzed headspaces and/or input. The data packet can include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

In one exemplary implementation, a client 1302 can transfer an encoded file, (e.g., encoded media item), to server 1304. Server 1304 can store the file, decode the file, or transmit the file to another client 1302. It is noted that a client 1302 can also transfer uncompressed files to a server 1304 and server 1304 can compress the file and/or transform the file in accordance with this disclosure. Likewise, server 1304 can encode information and transmit the information via communication framework 1306 to one or more clients 1302.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive-in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable instructions that, when executed by the at least one processor, facilitate performance of operations, comprising:

requesting, from network equipment of a radio access network, configuration capability information representative of a configuration capability of the radio access network;

in response to requesting the configuration capability information, receiving the configuration capability information from the network equipment;

based on the configuration capability of the radio access network, determining a configuration change applicable to the radio access network; and applying the configuration change to the radio access network, wherein the configuration change comprises a change to one or more parameters associated with the radio access network, wherein the one or more parameters comprise a synchronization signal block subcarrier spacing, and wherein the configuration capability information specifies a group of actions to be performed by the system to complete the configuration change across a group of network functions of the radio access network.

2. The system of claim 1, wherein the configuration capability information is based on mapping information representative of a mapping between northbound interface messages and southbound interface messages of the radio access network.

3. The system of claim 1, wherein the configuration capability information is determined during runtime of the network equipment, and wherein any change to the configuration capability is automatically reported by the radio access network.

4. The system of claim 1, wherein the configuration capability information comprises parameters that are concurrently configurable.

5. The system of claim 1, wherein the configuration capability information comprises a configuration delay applicable to the configuration change, and wherein the configuration delay is determined via a measured delay applicable to the configuration change or via a predicted delay applicable to the configuration change.

6. The system of claim 1, wherein the configuration change is determined based on a traffic load applicable to the radio access network.

7. The system of claim 1, wherein the configuration change is determined based on a predicted network impact on the radio access network.

8. The system of claim 1, wherein the group of actions comprises at least one of an immediate activation, an event-based activation, a cell lock, a node lock, a delay execution with a maximum window limit, or a network function restart.

9. The system of claim 1, wherein the one or more parameters further comprise at least one of a user label, a performance metric job, an absolute frequency of a synchronization signal block, a cell local identifier, a public land mobile network identifier, a gNodeB identifier, a gNodeB identifier length, a third generation partnership project standard, an open radio access network standard, or a vendor specific standard.

10. The system of claim 1, wherein determining the configuration change comprises grouping configuration parameters that share a common subgroup of the group of actions into a common reconfiguration message or batch.

11. A non-transitory machine-readable medium, comprising executable instructions that, when executed by at least one processor, facilitate performance of operations, comprising:

receiving, from a service and management and orchestration network device, a patch of parameters for reconfiguration;

based on the patch of parameters, determining configuration capability information representative of a configuration capability of a radio access network;

based on the configuration capability of the radio access network, determining a configuration change applicable to the radio access network;

applying the configuration change to the radio access network, or in response to a determination that the configuration change cannot currently be applied to the radio access network, sending, to the service and management and orchestration network device, feedback to reconfigure a parameter of the service and management and orchestration network device, wherein the configuration change comprises a change to one or more parameters associated with the radio access network, wherein the one or more parameters comprise a synchronization signal block subcarrier spacing, and wherein the configuration capability information specifies a group of actions to be performed by the service and management and orchestration network device to complete the configuration change across a group of network functions of the radio access network; and sending the group of actions to the service and management and orchestration network device.

12. The non-transitory machine-readable medium of claim 11, wherein the configuration capability information is based on mapping information representative of a mapping between northbound interface messages and southbound interface messages of the radio access network.

13. The non-transitory machine-readable medium of claim 11, wherein the configuration capability information comprises parameters that are simultaneously configurable.

14. The non-transitory machine-readable medium of claim 11, wherein the configuration capability information comprises a configuration delay applicable to the configuration change.

15. The non-transitory machine-readable medium of claim 11, wherein the configuration change is determined based on a traffic load applicable to the radio access network.

16. A method, comprising:

requesting, from network equipment of a radio access network, by a service and management and orchestration network device, configuration capability information representative of a configuration capability of the radio access network;

in response to requesting the configuration capability information, receiving, by the service and management and orchestration network device, the configuration capability information from the network equipment;

based on the configuration capability of the radio access network, determining, by the service and management and orchestration network device, a configuration change applicable to the radio access network; and applying, by the service and management and orchestration network device, the configuration change to the radio access network, wherein the configuration change comprises a change to one or more parameters associated with the radio access network, wherein the one or more parameters comprise a synchronization signal block subcarrier spacing, and wherein the configuration capability information specifies a group of actions to be performed by the service and management and orchestration network device to complete the configuration change across a group of network functions of the radio access network.

17. The method of claim 16, wherein the configuration change is determined based on a predicted network impact on the radio access network.

18. The method of claim 16, wherein the group of actions comprises at least one of an immediate activation, an event-based activation, a requested cell lock, a requested node lock, a delay execution with a maximum window limit, or a requested network function restart.

19. The method of claim 16, wherein the configuration change comprises a change to one or more parameters associated with the radio access network.

20. The method of claim 16, wherein the configuration capability information is based on mapping information representative of a mapping between northbound interface messages and southbound interface messages of the radio access network.

* * * * *